(12) United States Patent
Delrue et al.

(10) Patent No.: US 10,520,202 B2
(45) Date of Patent: Dec. 31, 2019

(54) ELECTRIC COOKING APPARATUS HAVING AN AIR FLOW

(71) Applicant: SEB S.A., Ecully (FR)

(72) Inventors: Olivier Delrue, Selongey (FR); Cedric Mugnier, Selongey (FR); Olivier Le Grand, Messigny et Vantoux (FR); Erwann Govin, Selongey (FR)

(73) Assignee: SEB S.A. (FR)

( * ) Notice: Subject to any disclaimer, the term of this patent is extended or adjusted under 35 U.S.C. 154(b) by 25 days.

(21) Appl. No.: 14/439,406

(22) PCT Filed: Oct. 28, 2013

(86) PCT No.: PCT/FR2013/052560
§ 371 (c)(1),
(2) Date: Apr. 29, 2015

(87) PCT Pub. No.: WO2014/068225
PCT Pub. Date: May 8, 2014

(65) Prior Publication Data
US 2015/0292750 A1    Oct. 15, 2015

(30) Foreign Application Priority Data

Oct. 31, 2012    (FR) ..................................... 12 60443

(51) Int. Cl.
*A47J 37/12*        (2006.01)
*F24C 15/32*        (2006.01)
(Continued)

(52) U.S. Cl.
CPC ......... *F24C 15/325* (2013.01); *A47J 37/0641* (2013.01); *A47J 37/1257* (2013.01); *F24C 7/043* (2013.01); *A47J 36/165* (2013.01)

(58) Field of Classification Search
CPC .. A47J 37/0641; A47J 37/1257; A47J 36/165; A47J 37/043; A47J 37/0623;
(Continued)

(56) References Cited

U.S. PATENT DOCUMENTS 5,400,697 A * 3/1995 Dax ..................... A47J 37/0807
                                              392/424
5,588,353 A * 12/1996 Glucksman ............ A21B 7/005
                                              99/348
(Continued)

FOREIGN PATENT DOCUMENTS

AU     2011278149 B2     7/2011
DE         2102062        7/1972
(Continued)

*Primary Examiner* — Ibrahime A Abraham
*Assistant Examiner* — Biniam B Asmelash
(74) *Attorney, Agent, or Firm* — The Webb Law Firm

(57) ABSTRACT

Provided is an electric apparatus for cooking and/or reheating food, including: a housing having a cooking tray arranged such as to receive the food to be cooked and/or reheated, a circuit for heating by ventilation, including a ventilation sleeve having an outlet arranged such as to direct an air flow onto the food to be cooked and/or reheated, and the heating means arranged in the ventilation sleeve such as to heat the air flow by radiation and by convection, wherein at least a portion of the heating means is arranged relative to the outlet of the ventilation sleeve, whereby the heat radiation produced by said portion of the heating means directly heats the food to be cooked and/or reheated.

12 Claims, 1 Drawing Sheet

(51) Int. Cl.
*A47J 37/06* (2006.01)
*F24C 7/04* (2006.01)
*A47J 36/16* (2006.01)

(58) Field of Classification Search
CPC ..... A47J 37/047; A47J 37/106; F24C 15/325; F24C 7/043
USPC .......... 99/348, 403, 447, 468, 475; 219/336, 219/400, 403, 730, 731
See application file for complete search history.

(56) References Cited

U.S. PATENT DOCUMENTS

| | | | |
|---|---|---|---|
| 2008/0163764 A1 | 7/2008 | Payen et al. | |
| 2008/0213447 A1* | 9/2008 | Payen | A47J 37/0641 426/438 |
| 2010/0025390 A1* | 2/2010 | Ruther | F24C 15/325 219/400 |

FOREIGN PATENT DOCUMENTS

| | | | | |
|---|---|---|---|---|
| DE | 2102062 A1 * | 7/1972 | ............ | A47J 36/165 |
| WO | 2006/000700 A2 | 1/2006 | | |
| WO | 2012/007681 A2 | 1/2012 | | |

\* cited by examiner

ELECTRIC COOKING APPARATUS HAVING AN AIR FLOW

CROSS-REFERENCE TO RELATED APPLICATIONS

This application is the United States national phase of International Application No. PCT/FR2013/052560 filed Oct. 28, 2013, and claims priority to French Patent Application No. 1260443 filed Oct. 31, 2012, the disclosures of which are hereby incorporated in their entirety by reference.

FIELD OF THE INVENTION

The present invention relates in general to an electric cooking appliance, and in particular to an appliance arranged such as to cook food with a hot air flow.

DESCRIPTION OF RELATED ART

Deep fryers utilizing a hot air flow are known to the prior art. Accordingly, document WO2006000700A2 describes a cooking appliance comprising a ventilation circuit including a heating resistor. However, the cooking times required in this type of appliance for establishing a Maillard reaction sufficient for conferring a golden and crispy texture to the food vary according to the food, because the exchanges of heat via convection-conduction are limited by the characteristics of the food itself. As a result, it is difficult to propose a reduced preparation time. Furthermore, the heating characteristics vary according to the voltage, and if a low voltage power supply is provided, the bulk of these heating elements increases in order to maintain the heating power.

An object of the present invention is to address the above-mentioned disadvantages of the prior art and in particular, firstly to propose a cooking appliance having a hot air flow, but which permits reduced preparation times.

SUMMARY OF THE INVENTION

To this end, a first aspect of the invention relates to an electric appliance for cooking and/or reheating food, comprising:
  a housing with a cooking tray arranged such as to receive the food to be cooked and/or reheated,
  a circuit for heating by ventilation, comprising a ventilation sleeve having an outlet arranged such as to direct a hot air flow onto the food to be cooked and/or reheated,
  heating means arranged in the ventilation sleeve such as to heat the air flow by radiation and by convection, characterized in that at least a portion of the heating means is arranged relative to the outlet of the ventilation sleeve in such a way that the heat radiation produced by said portion of the heating means directly heats the food to be cooked and/or reheated.

Because the heating means that heat the air flow also heat the food by radiation due to the fact that they are arranged opposite the outlet of the air flow toward the food, the appliance of the invention actually makes it possible to reduce the cooking time. In other words, the heating means are arranged in such a way that they are able to radiate directly onto the food so that the latter receives heat not only from the air flow via conduction-convection, but also from the heating means via radiation. The surface of the food exposed to direct radiation from the heating means thus cooks faster than it would if it only received heat from the air flow. The heat radiation produced by this portion of the heating means follows a straight, unobstructed path from the emitting portion for directly heating the food in the cooking tray, hence there is no heat loss and the cooked food acquires a golden and crispy surface.

According to an embodiment, the heating means comprise a bare wire resistor arranged such as to generate heat during the cooking and/or reheating of the food.

According to this implementation, the heating wire is at least partially opposite the outlet, which is counterintuitive to persons skilled in the art, who would tend to arrange these electrically conductive elements remote from the outlet in order to avoid possible contact with the food or any other object via the outlet.

According to an embodiment, the heating means comprise:
  a first heating element having a first wire resistor mounted on a first support and comprising the portion arranged opposite the outlet of the ventilation sleeve, and
  a second support in the shape of a vane, arranged in the ventilation sleeve upstream of the first heating element such as to redirect at least part of the air flow onto the first heating element.

According to this implementation, the first heating element is properly ventilated by the air flow redirected by the second support. The second support can be used for correcting any heterogeneity of the air flow and for ventilating the first heating element, and as a result, the first heating element, properly cooled by the redirected air flow, will not develop any hot spots, thus guaranteeing it a long useful life.

According to an embodiment, the second support forms a second heating element, which is separated from the first heating element and has a second wire resistor mounted on the second support.

According to this implementation, the heating means comprise two separate heating elements arranged in the ventilation sleeve, and the second heating element redirects part of the air flow onto the first heating element. This implementation makes it possible to optimize the heat exchanges between the air flow and the first heating element and thus improve the output of the appliance.

According to an embodiment, the part of the air flow directed onto the first heating element is directed onto the portion of the heating means radiating directly onto the food. This portion of the heating means opposite the food, and thus near the outlet, is located in a zone of lower air flow velocity (because the cross-section of the passage widens abruptly at the outlet) and is thus poorly ventilated. The redirection of part of the air flow onto this portion cools it more efficiently and prevents it from overheating.

According to an embodiment, the second support comprises openings for allowing the passage of part of the air flow. These openings also make it possible to regulate the distribution of the air flow between the sides of the second support in order to improve, for example, the homogeneity of the flow characteristics in the ventilation sleeve.

According to an embodiment, the first support and the second support are made of a ceramic material.

According to an embodiment, the appliance comprises a fan arranged such as to create the air flow during the cooking and/or reheating, and the ventilation sleeve forms a conduit with solid walls conducting the air flow from the fan to the outlet.

According to an embodiment, the outlet of the ventilation sleeve is arranged above the cooking tray.

According to an embodiment, the appliance comprises a cover arranged such as to close a cooking space above the tray, and part of the ventilation sleeve is arranged in the cover.

According to an embodiment, the appliance comprises stirring means arranged such as to coat said food automatically with a film of fat by stirring said food together with fat.

According to an embodiment, the stirring means comprise at least one blade.

According to an embodiment, the appliance forms a deep fryer.

BRIEF DESCRIPTION OF THE DRAWINGS

Other features and advantages of the present invention will emerge more clearly upon reading the following detailed description of an embodiment of the invention, which is provided as a non-limiting example and which is illustrated in the appended drawings, wherein.

DETAILED DESCRIPTION OF THE INVENTION

According to the invention, the appliance is a household appliance, in other words one specifically designed and dimensioned for home use, for instance in a family setting. To this end, the appliance can be manipulated manually by the user thereof, for instance to move it from a cabinet to a work surface. In other words, preference is given to the appliance being portable.

The appliance according to the invention is preferably designed and dimensioned for cooking and/or reheating certain kinds of food such as potato chunks.

The general design of the appliance of the invention allows considerable versatility in terms of cooking methods such that the term "cooking" used herein covers different methods of preparing food such as frying, browning, roasting, or searing.

In a preferred alternative embodiment, which corresponds to the examples illustrated in the figures, the appliance according to the invention is preferably designed and dimensioned for heat treating food in such a way as to confer the latter with gustatory qualities essentially equivalent or close to those of fried food, and specifically food fried in an oil bath. In this alternative embodiment, the appliance according to the invention thus constitutes a fryer, and more particularly a deep fryer. Here deep frying is used to designate a method of cooking food without immersion (whether partial and/or temporary) of the latter in a bath of oil or fat during the cooking cycle.

Rather, the expression deep frying designates cooking in which the food is admittedly moistened by a cooking medium (for example, oil), but without being immersed or soaking in said medium. In this respect, the operating principle of the fryer according to the invention differs from that of a standard oil bath fryer, particularly in that it allows the creation of conditions for establishing a Maillard reaction sufficient for conferring the golden, crispy texture of fried foods to the food without said food having been completely and directly immersed in a bath of burning oil.

Figure 1:
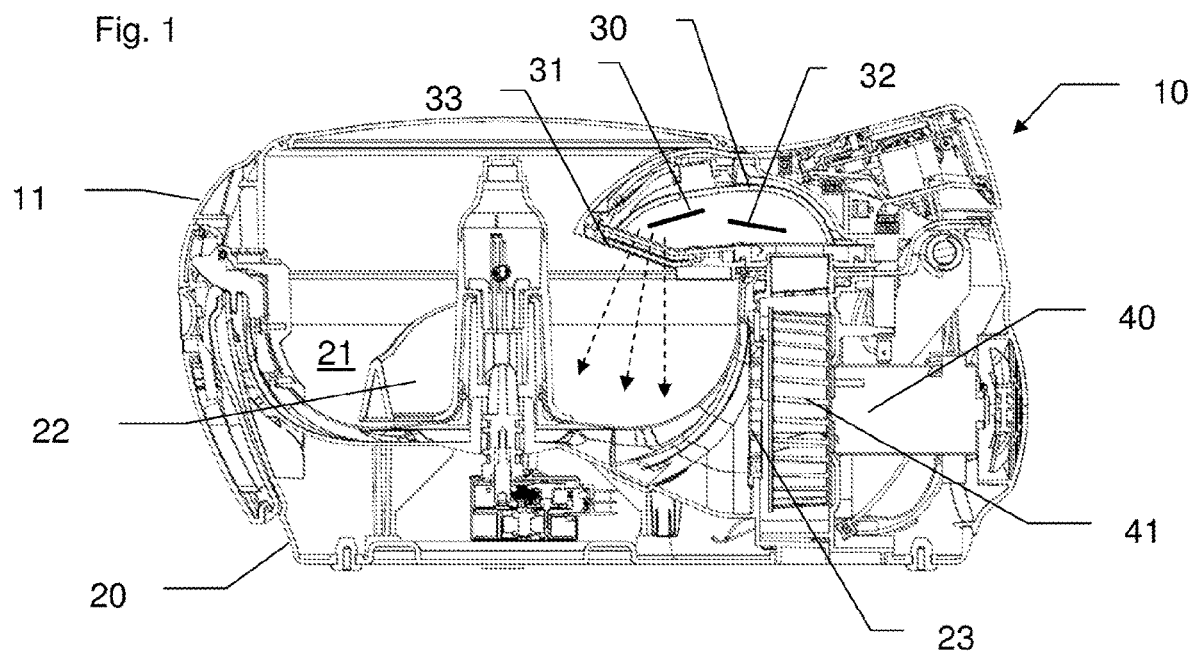
FIG. 1 is a general cutaway view of an appliance of the invention.

FIG. 1 is a cutaway view of an appliance 10 forming a deep fryer, with a cover 11 and a housing 20. The housing 20 comprises a cooking tray 21 in which is located a stirring blade 22, which is detachably arranged in the cooking tray 21 such as to turn about a rotational axis in order to stir and turn over the food being cooked and/or reheated. In order to cook and/or reheat the food in the cooking tray 21, the appliance 10 comprises a heating circuit with a fan formed by an impeller 41 driven in rotation by an electric motor 40, which creates an air flow in a ventilation sleeve 30, in which are arranged a first heating element 31 and a second heating element 32. The ventilation sleeve 30 comprises an outlet 33 above the cooking tray 21 for projecting the air flow onto the food located in the bottom of the cooking tray 21. During operation, the two heating elements 31 and 32 are bathed by the air flow, which they heat by convection and radiation. In addition, the first heating element 31 has a portion arranged near the outlet 33 in such a way that said portion is directly opposite the food in the bottom of the cooking tray 21. As a result, the radiation emitted by this portion of the first heating element and propagating in a straight line will be directly incident on the food. In addition to the heating by conduction-convection provided by the air flow, a direct heating by radiation is thus obtained. The arrows with dotted lines schematically illustrate this heating method, in which the portion of the first heating element 31 radiates heat directly onto the food in the cooking tray 21.

Figure 2:
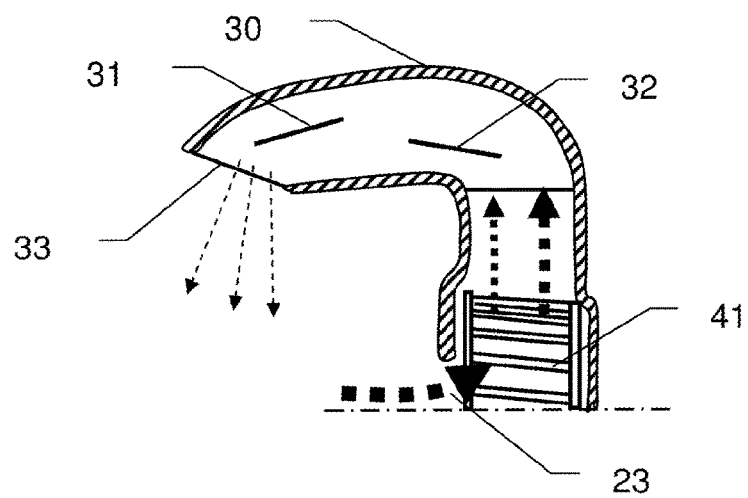
FIG. 2 is a detailed view of the ventilation sleeve of the appliance of FIG. 1.

FIG. 2 illustrates a portion of the ventilation circuit. The impeller 41 is arranged such as to suction air through a grill 23 arranged on the side of the tray, and blow it into the ventilation sleeve 30. As indicated by the two dashed arrows above the impeller 41, the air flow in the sleeve 30 is not homogeneous; it is greater on the outer side of the elbow of the ventilation sleeve 30. The first and second heating elements 31 and 32 are arranged in the ventilation sheath 30. They are each composed of a bare wire resistor coiled on a support made of, for example, a ceramic material.

Figure 3:
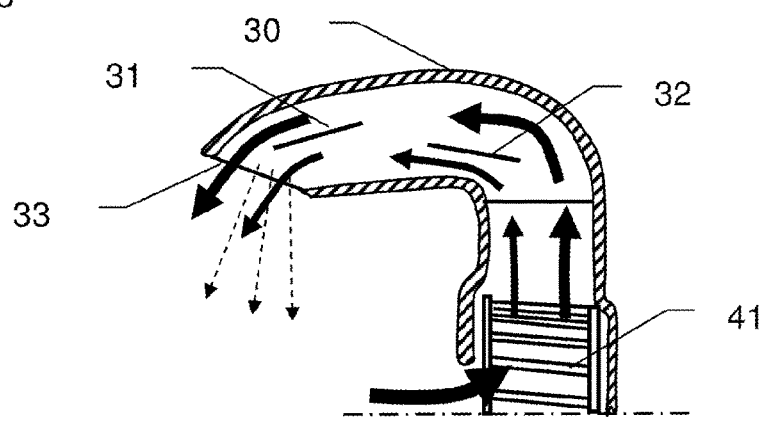
FIG. 3 is an illustration of the ventilation sleeve of FIG. 2 with the appliance in operation.

FIG. 3 represents the ventilation sleeve 30 traversed by an air flow during the operation of the appliance 10. The second heating element 32, which is positioned upstream of the first heating element 31, redirects part of the air flow traversing the ventilation sleeve 30 in order to ventilate the underside of the first heating element 31 properly. An effective cooling of this underside is obtained, thus preventing hot spots from forming. As a result, a portion of the first heating element 31 can be arranged in proximity to the outlet 33 such that it radiates directly onto the food in the tray 21, which makes it possible to reduce the cooking time and still obtain food that is golden and crispy on the outside, owing to the direct radiant heating.

It is understood that diverse modifications and/or improvements obvious to persons skilled in the art can be made to the different embodiments of the invention described in the present description, without exceeding the scope of the invention defined by the appended claims.

The invention claimed is:

1. An electric appliance for cooking and/or reheating food, comprising:
   a housing with a cooking tray arranged such as to receive food to be cooked and/or reheated,
   a circuit for heating by ventilation, comprising a ventilation sleeve with an outlet arranged such as to direct an air flow containing heat radiation onto the food to be cooked and/or reheated,
   a heating means comprising heating elements arranged in the ventilation sleeve such as to heat the air flow by radiation and by convection, wherein at least one heating element of the heating means is arranged relative to the outlet of the ventilation sleeve to be directly opposite the food in a straight, unobstructed path during cooking and/or reheating in such a way that heat radiation produced by said at least one heating element of the heating means directly contacts the food and heats the food to be cooked and/or reheated, and wherein the heating elements comprise: a first heating element with a first wire resistor mounted on a first support and which is the at least one heating element arranged relative to the outlet of the ventilation sleeve directly opposite the food in a straight, unobstructed path during cooking and/or reheating, and a second support in the form of a vane, arranged in the ventilation sleeve upstream of the first heating element such as to redirect at least part of the air flow onto the first heating element.

2. The appliance as in claim 1, wherein the heating elements comprise a bare wire resistor arranged such as to generate heat during the cooking and/or reheating of the food.

3. The appliance as in claim 1, wherein a second support forms a second heating element separated from the first heating element and having a second wire resistor mounted on the second support.

4. The appliance as in claim 1, wherein the part of the air flow directed onto the first heating element is directed onto the portion of the heating means radiating directly onto the food.

5. The appliance as in claim 3, wherein the second support comprises openings for permitting the passage of part of the air flow.

6. The appliance as in claim 3, wherein the first support and the second support are made of a ceramic material.

7. The appliance as in claim 1, comprising a fan arranged such as to create the air flow during the cooking and/or reheating, and wherein the ventilation sleeve forms a conduit with solid walls conducting the air flow from the fan to the outlet.

8. The appliance as in claim 1, wherein the outlet of the ventilation sleeve is arranged above the cooking tray.

9. The appliance as in claim 1, comprising a cover arranged such as to close a cooking space above the cooking tray, and wherein part of the ventilation sleeve is arranged in the cover.

10. The appliance as in claim 1, comprising stirring means arranged such as to coat said food automatically with a film of fat by stirring said food together with fat.

11. The appliance as in claim 10, wherein the stirring means comprise at least one blade.

12. The appliance as in claim 1, defining a deep fryer.

* * * * *